(12) United States Patent
Canter

(10) Patent No.: US 10,387,662 B2
(45) Date of Patent: *Aug. 20, 2019

(54) FLASH MEMORY DEVICE FOR STORING SENSITIVE INFORMATION AND OTHER DATA

(71) Applicant: Jeffrey B. Canter, West Orange, NJ (US)

(72) Inventor: Jeffrey B. Canter, West Orange, NJ (US)

(73) Assignee: Jeffrey B. Canter, West Orange, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/037,822

(22) Filed: Jul. 17, 2018

(65) Prior Publication Data

US 2018/0341776 A1    Nov. 29, 2018

Related U.S. Application Data

(63) Continuation-in-part of application No. 15/022,221, filed on Mar. 16, 2016, now Pat. No. 10,025,728.

(Continued)

(51) Int. Cl.
*G06F 3/06* (2006.01)
*G06F 21/60* (2013.01)
(Continued)

(52) U.S. Cl.
CPC .......... *G06F 21/602* (2013.01); *G06F 3/0623* (2013.01); *G06F 3/0659* (2013.01);
(Continued)

(58) Field of Classification Search
CPC ........ G06F 3/062; G06F 3/0622; G06F 21/60; G06F 21/78; G06F 21/79
See application file for complete search history.

(56) References Cited

U.S. PATENT DOCUMENTS 6,457,126 B1 * 9/2002 Nakamura .............. G06F 21/79
380/277
7,873,837 B1 * 1/2011 Lee ...................... G06F 12/1416
713/179

(Continued)

FOREIGN PATENT DOCUMENTS

EP        1056015        11/2000
JP     2004-152123        5/2005
(Continued)

OTHER PUBLICATIONS

NIST, Advanced Encryption Standard (AES), Federal Information Processing Standards Publication 197, Nov. 26, 2001. Springfield, VA.

(Continued)

*Primary Examiner* — Khang Do
(74) *Attorney, Agent, or Firm* — Scott J. Asmus

(57) ABSTRACT

A flash memory system for encrypting and storing data in a non-volatile flash memory associated with a host system. The device includes flash memory, encryption engine, random number generator, cryptographic hash engine, key store, static random-access memory to interface with the host system, and associated control circuitry. When powered on, the device determines if a valid encryption key is held in the key store. If a valid key is held, a program flag is set when encrypted data in the flash memory is ready to be decrypted and stored in the static random access memory for use by the host system, or when data originating from the host system and stored in the static random access memory is ready to be encrypted by the engine and programmed into the flash memory. The device can be embedded in any host system wherein data is encrypted while at rest in memory.

18 Claims, 2 Drawing Sheets

Related U.S. Application Data

Figure 1:
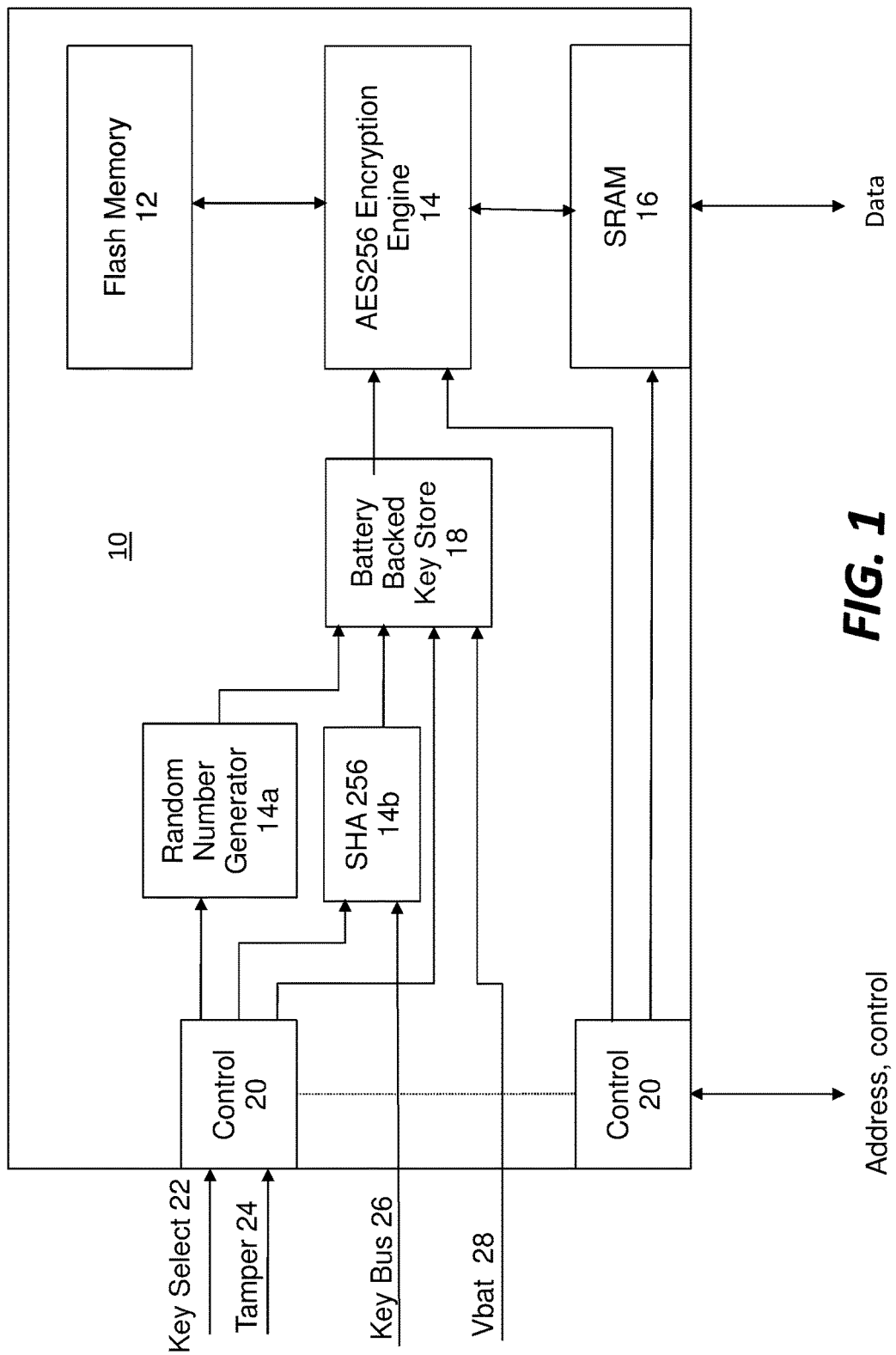

(60) Provisional application No. 62/025,052, filed on Jul. 16, 2014.

(51) Int. Cl.

| | | |
|---|---|---|
| *H04L 9/08* | (2006.01) | |
| *H04L 9/32* | (2006.01) | |
| *H04L 9/06* | (2006.01) | |
| *G06F 21/78* | (2013.01) | |
| *G09C 1/00* | (2006.01) | |

(52) U.S. Cl.
CPC ............ *G06F 3/0679* (2013.01); *G06F 21/78* (2013.01); *G09C 1/00* (2013.01); *H04L 9/0643* (2013.01); *H04L 9/0866* (2013.01); *H04L 9/0869* (2013.01); *H04L 9/0897* (2013.01); *H04L 9/3242* (2013.01)

(56) References Cited

U.S. PATENT DOCUMENTS

| | | | |
|---|---|---|---|
| 2003/0046238 | A1 | 3/2003 | Nonaka |
| 2004/0066274 | A1 | 4/2004 | Bailey |
| 2004/0088554 | A1* | 5/2004 | Kawaguchi ......... G06F 12/1433 713/189 |
| 2007/0198856 | A1 | 8/2007 | Lee |
| 2008/0063183 | A1 | 3/2008 | Greco et al. |
| 2008/0117679 | A1* | 5/2008 | Srinivasan ............... G06F 21/79 365/185.04 |
| 2008/0192928 | A1* | 8/2008 | Yu ...................... G06F 12/1416 380/44 |
| 2010/0235575 | A1* | 9/2010 | Yasaki .................. G06F 21/554 711/115 |
| 2010/0268856 | A1* | 10/2010 | Smith ................... G06F 3/0605 710/74 |
| 2012/0005488 | A1* | 1/2012 | Yoon ..................... H04L 9/0625 713/193 |
| 2012/0110345 | A1* | 5/2012 | Pigeon ................ H04L 63/0435 713/189 |
| 2013/0219189 | A1 | 8/2013 | Simmons |
| 2014/0047246 | A1 | 2/2014 | Seol et al. |

FOREIGN PATENT DOCUMENTS

| | | |
|---|---|---|
| JP | 2008-310950 | 12/2008 |
| JP | 2010-238216 | 10/2010 |

OTHER PUBLICATIONS

Dod, Protection of Mission Critical Functions to Achieve Trusted Systems and Networks (TSN), Nov. 5, 2012. No. 5200.44.
Motorola, Security Policy: Key Management Facility Crypto Card (KMF CC), Version 2.0, Feb. 11, 2002.
Securre-Stor(tm) SATA Encrypted Solid State Drives, http://www.microsemi.com/products/solid-state-drives/securre-stor, May 5, 2015.
Trrust-Stor(tm) Solid State Drive, http://www.microsemi.com/products/solid-state-drives/trrust-stor-ssd, May 5, 2015.
Embedded Flash, http://www.microsemi.com/products/memory/embedded-flash, May 5, 2015.
Morris Dworkin, NIST, Recommendation for Block Cipher Modes of Operation, Methods and Techniques. NIST Special Publication 800-38A, 2001 Edition. Computer Security Division. Dec. 2001.
Elaine Barker and John Kelsey, NIST, Recommendation for Random Number Generation Using Deterministic Random Bit Generators, Computer Security Division, Information Technology Laboratory. NIST SP 800-90A. Jan. 2012.

\* cited by examiner

FLASH MEMORY DEVICE FOR STORING SENSITIVE INFORMATION AND OTHER DATA

CLAIM OF PRIORITY

This application claims the benefit of U.S. Provisional Patent Application No. 62/025,052 filed Jul. 16, 2014, and claims priority as a continuation-in-part to U.S. patent application Ser. No. 15/022,221 filed May 19, 2015, the contents of which are incorporated herein by reference.

BACKGROUND

The present disclosure relates generally to flash memories, and particularly to a flash memory device for storing critical or sensitive technical information and other data.

Flash memories were developed from electronically erasable programmable read only memories (EEPROMs), and are used typically for storing programs and other non-volatile data for access and use by processors in the systems in which they reside. Flash memories may be of either a NAND or a NOR type, depending on the internal characteristics of the individual memory cells embedded in the memory. All or selected blocks of data stored in a flash memory can be electronically erased and reprogrammed. See, https://en.wikipedia.org/wiki/Flash_memory, and references cited therein.

If data to be stored in a flash memory is proprietary or sensitive, the data may need to be encrypted while at rest in the memory. For example, to comply with current anti-tamper (AT) requirements imposed by the United States Department of Defense (DoD) in DFARS 252.204-7012 (Nov. 18, 2013), contractors need to provide adequate security to safeguard unclassified Controlled Technical Information (CTI) from being compromised. CTI is defined in the cited document as technical information with military or space application that is subject to controls on access, use, reproduction, modification, performance, display, release, disclosure, or dissemination of the information. See also DoD Instruction No. 5200.44 (Nov. 5, 2012).

Other proprietary applications may also require sensitive software and data to be encrypted before the data is stored in a non-volatile memory of a host system. In order to encrypt such software or data for storage in the memory, an outside cryptographic engine and associated processor must be added to the system. That is, hardware and software external to that originally embedded in the system are required for the encryption. These additional components, which may be contained in multiple enclosures, would need to be imposed between the flash memory and the host system processor that accesses the memory, thus complicating and slowing the overall encryption process.

Self-encrypting solid state disk drives are commercially available, for example, from Microsemi Corporation, Aliso Viejo, Calif., US. These devices are not part of an embedded system, however, and they require additional busses (e.g. SATA or USB) and software drivers to operate. As far as is known, however, flash memories that can be part of an embedded system and feature a self-encrypting function without special busses or drivers, have not been previously offered or disclosed.

Accordingly, there is a need for an embeddable flash memory device configured so that information or data stored in the memory is kept in an encrypted form while at rest in the memory, without the need for an external cryptographic engine and additional hardware and software.

SUMMARY

The disclosure describes a method for encrypting sensitive program or other data for storage in a flash memory associated with a host system, wherein the host system writes data to and reads data from the memory. The method includes providing a flash memory device including a flash memory, an encryption engine for encrypting data originating from the host system and writing the encrypted data to the memory, and for decrypting data stored in the memory for access such as by the host system. A static random access memory (SRAM) is used for supplying the data from the host system to the encryption engine and for receiving the decrypted data from the encryption engine for access by the host system. A key store is used for holding an encryption key(s) supplied by either a cryptographic hash engine or a random number generator. When powered on, the device determines if a valid encryption key is held in the key store. If so, and if a program flag is set, then encrypted data in the flash memory is decrypted by the encryption engine and stored in the SRAM for access as required by the host system, and data originating from the host system and stored in the SRAM is encrypted by the encryption engine and stored in the flash memory. In one example the entire memory is not decrypted at one time, rather the data is decrypted as needed by the host system which is the way typical flash memory operates.

According to another aspect, a flash memory device for storing sensitive information or data includes a flash memory, an encryption engine for encrypting data originating from a host system and storing the encrypted data in the flash memory, and for decrypting encrypted data stored in the memory. There is an associated random number generator or cryptographic hash engine for creating an encryption key(s) when desired. A key store holds an encryption key(s) that is either created internally or hashed such as from a password entered by a user. A static random access memory (SRAM) supplies the data originating from the host system to the encryption engine, and receives decrypted data from the encryption engine for access by the host system. Control circuitry of the device is configured first to determine if a valid key is held in the key store. If so, the circuitry then determines if a program flag has been set to indicate either that encrypted data in the flash memory is ready for decryption by the encryption engine, or that the flash memory is ready to be programmed with encrypted data from the engine.

For a better understanding, reference is made to the following description taken in conjunction with the accompanying drawing and the appended claims.

BRIEF DESCRIPTION OF THE DRAWING FIGURES

Figure 2:
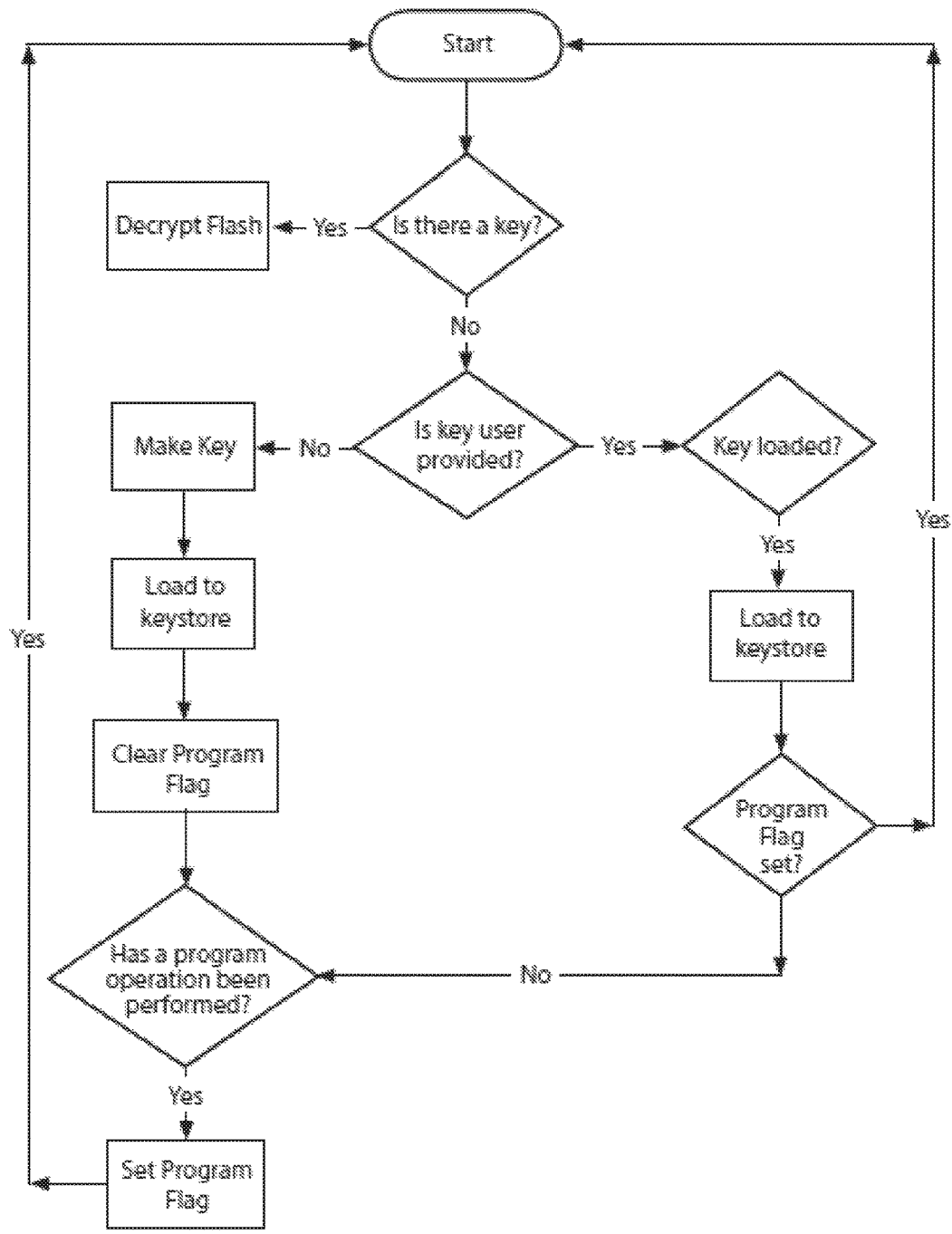

In the drawing:

FIG. 1 is a schematic block diagram of the inventive flash memory device according to one embodiment; and FIG. 2 is a flow diagram illustrating an operation of the memory device in FIG. 1 according to one embodiment.

DETAILED DESCRIPTION

FIG. 1 shows a flash memory device 10 with an encryption capability to assure data-at-rest protection. The device 10 can be used in existing or future host systems that require data, when stored in a memory for access by a processor in the host system, to be encrypted while at rest. As used herein, the term data refers broadly to any information capable of storage in a memory for access by a processor, whether or not the information is sensitive. This data includes software applications, personally identifiable information, financial information, technical data and the like.

The memory device 10 in one example includes a conventional flash memory 12, such as NAND or NOR type memory, and an encryption engine 14 with input and output (I/O) ports that are coupled to corresponding ports of the flash memory 12. In this example, the encryption engine 14 is configured in a known manner to encrypt data originating from a host system processor and to write the encrypted data to the flash memory 12, and to decrypt data stored in the flash memory 12 when called by the host system processor such as via processor control instructions. The encryption engine 14 in one embodiment implements the 256 bit Advanced Encryption Standard (AES), details of which can be obtained from Federal Information Processing Standards (FIPS) Publication 197 (November 2001), and NIST Special Publications 800-90A (January 2012) and 800-38A (2001), all relevant contents of which are incorporated by reference. The encryption engine 14 may be configured to implement either internally generated or externally provided encryption keys if desired for information that will be stored in the flash memory 12.

The memory device 10 in one example also includes an asynchronous volatile memory 16 such as a static random access memory (SRAM) to interface with the host system. In addition, the device 10 in one example includes an energy source such as a super capacitor or a battery such as the battery backed key store 18 that is coupled to the encryption engine 14, and control circuitry 20 coupled to the key store 18 and to the SRAM 16 as shown in FIG. 1. Terminals or pins associated with the key store 18 and the control circuitry 20 are described below. Further details of the key store 18 and the control circuitry 20 would be apparent to those skilled in the art.

Key Select 22—A terminal or pin 22 of the control circuitry 20 is provided to control the key store 18 so that the store will accept either a user supplied encryption key, or a self-generated encryption key. For example, if the pin 22 is set high, the encryption key is provided by the user. If pin 22 is low, the key, such as a 256 bit key, is generated via the random number generator 14a. In one example where pin 22 is high, the user input will be provided by a cryptographic hash engine 14b such as the SHA 256 or MD5 algorithm that will create the unique key by hashing the user input. This relieves the user from having to provide the AES 256 bit constrained key and allow the user to provide any input desired, regardless of length and content. There are any number of hash algorithms and in one embodiment the hash output is a 256 bit number, and satisfies NIST requirements such as FIPS 140-2 certification.

In one example the user makes the key type determination based on his or her concept of operations. A user derived key will allow encrypted data residing in the flash memory 12 to be processed after a tamper attempt signal is input to the control circuitry 20 on a pin 24 (see below). However, the user supplied key will require the user to manage and be responsible for distribution of the key among authorized personnel. An internally generated key will not require the user to manage the key distribution, but any data residing on the flash memory 12 will not be recoverable once a tamper attempt signal is input to the circuitry 20. In either case, a new key, whether user supplied or self-generated, will allow the flash memory 12 to be reprogrammed with encrypted data as long as a tamper event is not signaled.

Key Bus 26—This is a serial bus for inputting a user supplied encryption key to the key store 18. For example, if the key select pin 22 is set high, the bus 26 is active and the user supplied key is entered via the bus 26 into the SHA 256 engine to be hashed for the key store 18. If the key select pin 22 is set low, however, the bus 26 is disabled. Under no circumstances can an encryption key ever be read out from the device 10 via the bus 26 or otherwise.

Tamper 24—When a tamper attempt signal is input to the control circuitry 20 on the pin 24, and if main power is present when the signal is detected; the control circuitry 20 is configured to erase all information stored in the SRAM 16 and any key held in the key store 18. If main power is not present when a tamper attempt is signaled, the circuitry 20 will only operate to erase the key (if any) then held by the key store 18, since the SRAM will not contain any data.

Vbat 28—If voltage from the energy source such as a back-up battery is applied on pin 28 of the key store 18, any key held in the key store 18 is preserved in the event main power fails. Because keys are normally held in the key store when main power is present, the battery can be replaced as long as main power is present without affecting the operation or stability of the flash memory device 10. Either the main power or the back-up battery will hold the encryption key in memory. In the absence of both main power and voltage on pin 28 from the back-up battery, the key store 18 will not hold an encryption key.

According to one embodiment, at least some of the data from the host system is communicated to the SRAM and then processed by the encryption engine such that the encrypted data is stored in the flash memory.

Operation

According to one embodiment shown in the flow diagram of FIG. 2, upon power up or reset, the control circuitry 20 is configured to determine if the key store 18 contains a valid key (e.g., not all ones or all zeroes). If a valid key is found, in one embodiment the circuitry 20 looks for a program flag which indicates that the flash memory has been programmed with encrypted data. If the program flag is set, the circuitry 20 causes the encryption engine 14 to decrypt the system requested data stored in the flash memory 12 and to write the decrypted data to the SRAM 16. If the program flag is not set, the circuitry 20 waits for the program flag to be set to indicate the flash memory 12 has been programmed with data to be decrypted by the encryption engine 14. As long as a valid key is determined, the flash memory device 10 will continue to operate. In one example, an additional reset or power-on is not required as the state transitions are automated.

If the control circuitry 20 determines that the key store 18 does not contain a valid key, in one example the program flag is cleared (if previously set), and the state of the key select pin 22 is read. If the pin is, e.g., tied high, the circuitry 20 waits for a valid key to be supplied by the cryptographic hash engine 14b such as the SHA 256 implementation to the key store 18. In one example, the flash memory does not know the key or password provided by the user as it only knows the hash. However, since the hash is unique to any particular input, only the correct user input will produce the correct hash. Once such a valid key is loaded, the circuitry is configured to respond as described above for the case where a valid key is present. Note that if a valid but incorrect key is loaded, for example, after a tamper attempt, the encryption engine 14 may process encrypted data from the flash memory 12, but the encryption engine 14 will not yield intelligible or usable data. According to one example, the flash memory does not know that the key is incorrect as it sees a valid key (previously defined as not all 1s or all 0s) and a program flag, and will send the encrypted data through the encryption engine. What will come out will be unintelligible because the wrong key was used.

If the pin 22 is, e.g., tied low indicating that a valid key is provided to the key store 18, the circuitry 20 is configured to generate a key provided by the random number generator 14a. Once such a valid key is generated, the circuitry 20 waits for the flash memory 12 to be programmed with encrypted data, and the program flag is set. The program flag is preferably non-volatile so that if power is removed and subsequently restored, the device 10 will return to the state indicated by the program flag.

Note that the control circuitry 20 is configured to operate to distinguish between programmed and unprogrammed states of the flash memory 12, by reading the program flag which can be set only after a valid key has been entered in the key store 18 whether by the random number generator 14a or the encryption hash engine 14b implementation. When powered up and with a valid key held in the store 18, any data residing in the non-volatile flash memory 12 will be decrypted if the program flag is set, and programming of the flash memory 12 will be accepted if the flag is not set.

During operation, any data originating from the host system processor to be written in the flash memory 12 will be encrypted by the encryption engine 14 before storing the data in the memory 12. Since the data from the host system is written initially to the SRAM 16 of the memory device 10 (in operation of the device 10, all reads and writes are via the SRAM 16), the process of encrypting and writing the additional data to the flash memory 12 does not affect the access time.

It will be appreciated that in one example the inventive memory device 10 operates like a standard flash device from a system perspective. Therefore, typical address, data, and control signals (see FIG. 1) to and from the host system are not described in detail.

The memory device 10 can operate in any host system where battery backup and tamper indication are available. It can also operate keyless (generate its own key), or with a user supplied key. In either case, the key cannot be read externally. Importantly, the device 10 obviates the need for a separate encryption step and ensures that data stored in the flash memory 12 will be encrypted at rest without any intervention from the host system in which it is embedded. No external hardware or software is needed to accomplish the encryption function. The memory device is a complete unit and can be integrated into new designs as a replacement memory device or be implemented as a new feature.

While certain embodiments of the present invention are described and illustrated herein, it will be understood by persons skilled in the art that various modifications, additions, and changes can be made without departing from the spirit and scope of the invention. Accordingly, the invention encompasses all such modifications, additions, and changes that lie within the bounds of the following claims.

The invention claimed is:

1. A method of encrypting and decrypting data for non-volatile storage in a memory device, wherein at least one processor in a host system is programmed to write the data to the memory device and to read the data from the memory device, comprising:

providing a flash memory section;

encrypting the data originating from the host system via an encryption engine coupled to the flash memory section and writing the encrypted data to the flash memory section, and decrypting data stored in the flash memory section for access by the host system via the encryption engine;

supplying the data from the host system to the encryption engine via a static random access memory coupled to the encryption engine, and receiving the decrypted data from the encryption engine for access by the host system, holding at least one encryption key supplied via a cryptographic hash engine or a random number generator in a key store; and controlling operation of the memory device by control circuitry comprising allowing operation of the memory device in response to input signals corresponding to a key select and a tamper attempt;

determining if a valid key is held in the key store;

if the valid key is held in the key store, then determining if a program flag is set to indicate that encrypted data stored in the flash memory section is ready to be decrypted;

if the program flag is set, transitioning to a first state including writing and/or reading data to and from the flash memory section; and if the program flag is not set, transitioning to a second state including waiting for the program flag to be set, wherein the flash memory section, the encryption engine, the key store, the static random access memory, the random number generator, the cryptographic hash engine and the control circuitry reside within the memory device.

2. The method of claim 1, wherein the first state includes accepting data provided to the memory device by the host system by storing the data in the static random access memory for use by the encryption engine, encrypting the data, and storing the encrypted data in the flash memory section.

3. The method of claim 1, further comprising configuring the key store so that if the valid key is not held in the key store, transitioning to a third state including creating a self-generated encryption key and then transitioning to the second state or transitioning to a fourth state including waiting for a user supplied encryption key, according to the state of a key select input to the control circuitry.

4. The method of claim 1, further comprising storing the encryption key, whether created by the random number generator or the cryptographic hash engine, in a volatile key store memory region of the key store, and isolating the volatile key store memory region from operating regions of the static random access memory and the flash memory section.

5. The method of claim 4, further comprising powering the memory device, including the volatile key store memory region, from either a main power supply or a backup battery.

6. The method of claim 1, further comprising communicating between the host system and the flash memory without special busses or drivers.

7. The method of claim 1, further comprising creating the encryption keys from the random number generator or the cryptographic hash engine.

8. The method of claim 1, further comprising determining by a user whether the encryption keys are supplied externally or internally.

9. A memory device for storing data, comprising:
a flash memory;
an encryption engine coupled to the flash memory for encrypting data originating from at least one processor of a host system and storing the encrypted data in the flash memory, and for decrypting encrypted data stored in the flash memory;
a random number generator and a cryptographic hash engine associated with the encryption engine and configured for creating encryption keys;
a key store coupled to the encryption engine, the random number generator and the cryptographic hash engine for storing the encryption keys;
a static random access memory coupled to the encryption engine for supplying the data originating from the host system to the encryption engine, and for receiving and storing the decrypted data from the encryption engine for access by the host system; and
control circuitry coupled to the key store and the static random access memory, wherein the control circuitry is configured to allow operations of the memory device in response to control instructions from the processor as well as input signals corresponding to a key select and/or a tamper attempt, and for setting a program flag when encrypted data in the flash memory is ready for decryption by the encryption engine, and when the flash memory is ready to be programmed with encrypted data from the encryption engine,
wherein the flash memory, the encryption engine, the random number generator, the cryptographic hash engine, the key store, the static random access memory and the control circuitry reside within the memory device.

10. The memory device according to claim 9, wherein the key store includes a volatile key store memory region that is securely isolated from operating regions of the static random access memory and the flash memory.

11. The memory device according to claim 10, including a main power supply and a backup battery for powering the key store memory region.

12. The memory device according to claim 10, wherein the control circuitry is configured to determine if a valid key is held in the key store, if a valid key is held in the key store, then determine if the program flag is set, if the program flag is set, transition to a first state including writing and reading data to and from the flash memory in response to the operation of the host system, and if the program flag is not set, transition to a second state including waiting for the program flag to be set.

13. The memory device according to claim 12, wherein the control circuitry is configured so that when in the first state, the device accepts data provided to the device by the host system by storing the data in the static random access memory for use by the encryption engine, encrypts the data, and stores the encrypted data in the flash memory.

14. The memory device according to claim 13, wherein the control circuitry is configured so that if the valid key is not held in the key store, the device either transitions to a third state in which the encryption engine creates the valid key and the device then transitions to the second state or the device transitions to a fourth state wherein the device waits for the valid key to be entered by a user, according to a key select signal that is input to the control circuitry.

15. The memory device according to claim 9, wherein the cryptographic hash engine uses a SHA 256 hash algorithm.

16. The memory device according to claim 9, wherein the host system and the flash memory communicate without special busses or drivers.

17. The memory device according to claim 9, wherein the memory device is a replacement for existing system memory.

18. A system for storing and retrieving data, comprising:
a static random access memory configured to store the data and communicate with at least one host system;
an encryption engine coupled to the static random access memory, the encryption engine configured for encrypting at least some of the data from the host system;
a flash memory coupled to the encryption engine and configured to store the encrypted data, and wherein the encryption engine is configured for decrypting at least some of the data from the flash memory;
a key store coupled to the encryption engine storing one or more encryption keys used by the encryption engine for encrypting and decrypting the data;
at least one of a random number generator and a cryptographic hash engine coupled to the key store and configured to generate the encryption keys; and
control circuitry configured to respond to control instructions from the host system and input signals corresponding to a key select and/or a tamper attempt, wherein the control circuitry controls setting a program flag when encrypted data in the flash memory is to be decrypted by the encryption engine, and when the data from the static random access memory is to be encrypted by the encryption engine,
wherein the flash memory, the encryption engine, the random number generator, the cryptographic hash engine, the key store, the static random access memory and the control circuitry reside within the memory device.

* * * * *